3,166,404
RECOVERY OF RHODIUM FROM FISSION PRODUCTS

Eugene A. Hausman, Cranford, N.J., assignor, by mesne assignments, to Engelhard Industries, Inc., Newark, N.J., a corporation of Delaware
No Drawing. Filed Mar. 4, 1959, Ser. No. 797,026
2 Claims. (Cl. 75—83)

This invention relates to the recovery of rhodium from fission products and, more particularly, to the recovery of rhodium from waste streams of hot uranium reprocessing plants.

About 4–6 atom percent of Ru-103 is produced by fission of U-235, Pu-239, or U-233, and this Ru-103 decays to stable Rh-103. It is estimated that by 1975 the annual fission product rhodium production in the United States will be valued at 1,550,000 dollars and production will be rapidly increasing.

Fission of U-235, Pu-239 and Th-232 results in a yield-mass number distribution curve having peaks at mass numbers 90 to 105 and 130 to 145. Since the 90 to 105 grouping includes stable isotopes of ruthenium, rhodium and palladium, it is of interest as a new source of precious metals. Fission product yield distributions vary as a function of the isotope bombarded and neutron energy.

After 135 days of irradiation with 1 mev. neutrons and 0 day's cooling, 1.55 atoms of Ru-103 and 2.45 atoms of Rh-103 are present per 100 atoms of U-235 fissioned. Twenty precious metal atoms are produced for every 100 atoms of U-235 undergoing fission by 1 mev. neutrons. For Pu-239 and 2 mev. neutrons, 45.6 atoms of precious metal are produced per 100 atoms of Pu-239 fissioned.

In accordance with the present invention, recovery means is provided whereby rhodium metal may be separated from fission products in the waste streams from hot uranium reprocessing plants.

Rhodium does not have any unique reactions which permit the simple separation thereof from contaminants and, for this reason, rhodium purification is usually a multiple-stage process. If fission product rhodium contains 210 day half-life Rh-102, the purified rhodium will be radioactive. In 210 days, half of the activity is still left, and in 420 days, one-quarter remains; thus, in 1050 days, one-thirty-second of the original activity still remains. If the original activity was high, aging for three years might still leave too much radioactivity in the rhodium to permit its commercial use.

It is known that isotopic separation of radioactive Rh-102 from stable Rh-103 is a prohibitively expensive process. As an example of this cost, ordinary commercial uranium costs 10 cents per gram; the Atomic Energy Commission separates the U-235 isotope from the U-238 isotope and charges about twelve dollars per gram for the U-235. From this, it may be inferred that isotopic separation of Rh-102 and Rh-103 would not be a commercially feasible process. If fission product rhodium contains an excessive amount of radioactive Rh-102 isotope, then aging the rhodium until this decayed to an insignificant level, would appear to be the only alternative. This aging process may well take several years, during which time the rhodium could not be commercially used.

According to one embodiment of the present invention, the stable rhodium is isolated by first isolating its parent Ru-103. Although the stable daughter Rh-103, already formed, is thereby sacrificed, the radioactive Rh-102 is also avoided in the purified rhodium.

Ruthenium has one unusual property which permits the separation thereof from virtually all other elements; i.e., the volatility of ruthenium tetroxide. If the fission product waste stream is treated in such a manner as to distill out the ruthenium tetroxide, the rhodium already formed is left behind, as well as most other fission products. The ruthenium tetroxide is then reduced to ruthenium hydrated oxide or metallic ruthenium and allowed to stand for about one year. Its 40-day half-life results in virtually complete conversion to Rh-103 hydrated oxide or metallic Rh-103, respectively, in this period. After the elapse of a year of storage, the residual ruthenium is removed by distillation, leaving behind the daughter Rh-103, or Rh-103 hydrated oxide, which is subsequently reduced, and which, after a few weeks, is found to be non-radioactive to an extent such that it can be directly used as commercial rhodium. For example, the metastable 54-minute half-life Rh-103 disappears, much of it converting by isomeric transition to stable Rh-103.

The ruthenium tetroxide may be reduced directly to metallic ruthenium by treatment with hydrogen, or it may be reduced to ruthenium hydrated oxide by treatment with: (1) $SO_2$ in HCl, (2) $Na_2SO_3$ in HCl, or (3) the ruthenium tetroxide is boiled in caustic, with the addition of alcohol, resulting in the precipitation of ruthenium hydrated oxide. After storage for approximately one year, the decayed ruthenium hydrated oxide product, i.e., Rh-103 hydrated oxide, may be reduced by treatment with hydrogen or hydrazine.

The separation of ruthenium tetroxide by distillation may be performed using any of a number of reagents such as 10 percent nitric acid, free chlorine in alkaline solution, ozone sparging, bismuthate, permanganate, bromate, perchlorate and the like.

Alternatively, the ruthenium tetroxide may be separated from the fission products by a solvent extraction process using, for example, carbon tetrachloride as a selective solvent. The ruthenium tetroxide separated in this manner may then be reduced as described above.

Another method of separating rhodium from fission products comprises treating a waste stream to precipitate rhodium therefrom as the sulfide, converting the rhodium sulfide to a base-soluble complex rhodium salt, then adjusting the pH of the solution to the alkaline range to remove base-insoluble constituents thereof, after which the filtrate is converted to chloride, ruthenium and other volatile fission products are removed by distillation, and the rhodium chloride is reduced to rhodium metal. The rhodium metal is then converted to insoluble rhodium chloride, which is then washed with an acid, such as aqua regia, and reduced in hydrogen to rhodium metal. The distilled Ru-103 may be stored, converting after standing to Rh-103, as previously described, which is then recovered in non-radioactive form.

Nitric acid is a poor medium for the aqueous handling of precious metals. This is due to the fact that it is a powerful oxidizing agent and it interferes with required operations such as precipitation of sulfides and nitrition. This interference is due to the fact that sulfide and nitrite ions are reducing agents, thus resulting in an undesirable redox reaction with nitric acid.

For the destruction of nitric acid, evaporation of the solution can be used followed by hydrochloric acid addition and further evaporation. The hydrochloric acid can similarly be added first and then the solution can be evaporated. It is preferred to evaporate the solutions first to incipient dryness and then add the hydrochloric acid. Since the evaporation removes most of the free nitric acid, the resulting reaction when hydrochloric acid is then added (aqua regia is formed) is milder. The hydrochloric acid concentration used may be in the range of 0.1 to 12 M. Too dilute acid causes excess subsequent evaporation time, whereas too concentrated acid promotes a violent reaction with the remaining nitric acid.

It is preferred to use one liter of 10 percent hydrochloric acid per estimated 100 grams of solids. This is a compromise between the two stated extremes.

Sulfide precipitation of precious metals may be accomplished at a temperature between room temperature and boiling temperature. The reaction is quicker at boiling temperature and this condition is preferred. The hydrochloric acid concentration during precipitation may be in the range of 0.1 to 3 M HCl; preferably 0.5 M HCl is used.

Dissolution of the precious metal sulfides in aqua regia is rapid. An aqua regia solution consisting of 100 to 500 ml. of hydrochloric acid and 50 to 200 ml. of nitric acid per liter is found to give good results. An aqua regia solution consisting of 300 ml. of hydrochloric acid and 100 ml. of nitric acid diluted to one liter with water is very effective as a dissolving agent for 100 grams of precious metal sulfides.

Ruthenium oxides or rhodium chloride may be reduced to the corresponding metals by treatment with hydrogen at a temperature in the range of 300 to 1000° C. These reductions are best carried out at 500 to 600° C.

The reduction of rhodium to the metal from an aqueous solution of rhodium chloride may be accomplished by using any reducing agent capable of this reduction, i.e., iron, magnesium, aluminum, zinc, or formate ion. This may be done at a temperature in the range of room temperature to boiling temperature. Boiling temperatures result in quicker quantitative reductions and are therefore preferred.

The reaction times required for the various digestion and reduction steps of the invention are not critical and depend, in large measure, upon the concentrations of acids employed, the quantities involved, degree of agitation, reaction temperatures, and the like. However, all of the reduction and digestion steps of the processes of the invention may be completed within a period of a few minutes to about 24 hours but in some cases, using dilute acids and/or low temperatures, longer reaction times may be required.

*Example I*

Most aqueous fission product waste streams from hot uranium reprocessing plants are nitric acid solutions. Although ruthenium tetroxide can be directly distilled from such solutions, the yields are not generally reproducible and the variable nature of these solutions makes a preliminary separation advisable.

An aqueous fission product waste stream is evaporated just to incipient dryness, and one liter of 10 percent hydrochloric acid is added thereto per estimated 100 grams of solids, and the solution is reevaporated. This evaporation is repeated to insure destruction of nitrates. The residue is diluted with one liter of 0.5 M hydrochloric acid per 100 grams of solids present, and hydrogen sulfide is passed into the solution, at the boiling point thereof, until precipitation is complete. The insoluble sulfides are filtered and washed with hot water.

The sulfides are dissolved in one liter of solution containing 300 ml. of HCl and 100 ml. of HNO$_3$ per 100 grams of residue. This solution is evaporated to incipient crystallization and then evaporated to fuming with the addition of one liter of 10 percent sulfuric acid per 100 grams of original sulfide residue to eliminate both nitrates and chlorides. The residue is then diluted three-fold with 2 N H$_2$SO$_4$ and transferred to a distillation flask. Ruthenium tetroxide is distilled from this flask under the influence of additions of a ten percent sodium bromate solution, the distilled ruthenium tetroxide being collected in 1:1 HCl saturated with SO$_2$.

The residue after distillation is retained and stored for eventual rhodium recovery, after decay of the Rh-102.

The distilled ruthenium tetroxide in the trap is concentrated by evaporation, redissolved in boiling 1:10 HCl, added at the rate of one liter per 100 grams of residue, and filtered. The precipitate is discarded and the filtrate is adjusted to pH 6 with 10 percent sodium carbonate solution and boiled for thirty minutes. After cooling, the ruthenium hydroxide is filtered and the filtrate discarded. The ruthenium hydroxide is reduced in hydrogen at 500° C. and stored for one year to allow the Ru-103 to decay to Rh-103.

After the lapse of one year, the metal is fused with 5 times its weight of a 1:3 mixture of sodium peroxide-sodium hydroxide for four hours at the melting point of the flux. The melt is dissolved in one liter of water per 100 grams of melt and boiled for three hours to destroy unreacted peroxide, after which it is acidified with sulfuric acid and the residual Ru-101, 102, 103, 104 and 106 is distilled with bromate, as previously described.

The flask contents which now contain the rhodium are boiled with hydrochloric acid additions to destroy the excess bromate present. The rhodium is reduced from the solution with zinc, aluminum, or sodium formate, filtered, then chlorinated at 500° C. to yield insoluble RhCl$_3$. The rhodium chloride is boiled in 500 ml. of aqua regia, containing 150 ml. of HCl and 50 ml. of HNO$_3$ per 100 grams of RhCl$_3$, for three hours, washed with water and then reduced in hydrogen at 600° C.

The resulting rhodium is radioactive from short-lived rhodium isotopes, but these isotopes disappear in a short time and the rhodium has the same radioactivity as virgin rhodium.

*Example II*

A nitric acid fission product waste stream is evaporated to moistness several times from HCl to destroy the nitrates and is then adjusted to be 0.5 N in HCl.

Hydrogen sulfide is passed into the boiling solution until no more precipitate is formed; the insoluble sulfides are removed, filtered and washed with hydrogen sulfide saturated water. The fission product-containing filtrate is rejected. The precipitate is dissolved using one liter of water containing 300 ml. of HCl and 100 ml. of HNO$_3$ per 100 grams of precipitate. The following concentrations are all based on 100 grams of sulfide precipitate.

The solution is evaporated to moistness twice from one liter of 10 percent HCl to eliminate nitrates, taken up in one liter of 0.1 M hydrochloric acid, adjusted to pH 1.5 and then treated with sodium nitrite at boiling temperature until no further color change is noted (5 to 100 grams of NaNO$_2$). The hot solution is slowly adjusted to pH 10 with dropwise additions of 10 percent NaOH to precipitate the base metal hydroxides and leave the rhodium in solution. The solution is filtered and the precipitate is washed with hot water to remove any entrained precious metal nitrites; the precipitate is redissolved in hydrochloric acid and renitrited as before. The second fission product-containing hydroxide precipitate is discarded. The filtrates from both nitritions are combined and acidified with hydrochloric acid, evaporated to incipient dryness, diluted with one liter of 1 M HCl and again evaporated to incipient dryness, to destroy nitrites and nitrates.

The ruthenium and other volatile fission products are next removed by distillation which may be accomplished by distillation from 10 percent HNO$_3$, chlorine in caustic soda solution, ozone sparging, permanganate, bismuthate or bromate oxidation.

Using the bromate oxidation, the residue is treated with 300 ml. of 10 percent H$_2$SO$_4$ and evaporated until heavy fumes of SO$_3$ are evolved. The residue is diluted tenfold with water, transferred to a distilling flask and distilled under the influence of slow additions of a 10 percent sodium bromate solution. The distilled ruthenium tetroxide is collected in an HCl solution of SO$_2$.

The rhodium-containing flask residue is treated slowly with 10 percent HCl at boiling temperature to destroy unreacted bromate, this being accomplished by two evaporations from 500 ml. of 10 percent HCl.

The rhodium is now reduced from the solution, after adjustment of the pH to 1 with 10 percent sodium hydroxide solution. Sodium formate, zinc or aluminum may be used in the boiling solution; the reagent is used until no more rhodium is found to be reduced from the solution.

The metallic rhodium is chlorinated at 500° C. to yield insoluble $RhCl_3$ which is then boiled in 500 ml. of aqua regia, containing 150 ml. of HCl and 50 ml. of $HNO_3$, for three hours, washed with water and then reduced in hydrogen at 600° C.

The resulting rhodium is radioactive from short-lived rhodium isotopes but, after three weeks, these short-lived isotopes have virtually disappeared and the rhodium is found to be essentially the same in radioactivity as virgin rhodium.

If the residual radioactivity is too high for direct commercial use, the refining procedure can be repeated by dissolving the metallic rhodium in sulfuric acid, precipitating the rhodium as the sulfide, converting the rhodium sulfide to $Na_3Rh(NO_2)_6$, which is base-soluble, making the solution basic to remove base-insoluble constituents thereof, destroying the nitrito complex to form the hexachlororhodium complex, reducing the rhodium to metal, converting the metal to insoluble $RhCl_3$, washing with aqua regia, and reducing in hydrogen to the metal.

The chlorination of rhodium may be accomplished by treating rhodium with chlorine at 400 to 800° C., preferably 500° C. The ruthenium tetroxide distillation may be done under slight pressure, using air or chlorine as a sweep gas. Vacuum may be used to carry the product $RuO_4$ through the system or to accomplish the distillation at lower temperatures. The use of chlorine or air as a sweep gas under slight pressure is preferred.

It will be obvious to those skilled in the art that many modifications may be made within the scope of the present invention without departing from the spirit thereof, and the invention includes all such modifications.

What is claimed is:

1. A process for recovering rhodium from fission products which comprises treating an acid solution containing rhodium to precipitate insoluble sulfides therefrom, converting redissolved rhodium sulfide to a base-soluble complex rhodium salt, adjusting the pH of the solution to the basic range, removing precipitated base metal compounds, separating rhodium from the solution, and recovering rhodium metal.

2. A process for recovering rhodium from fission products which comprises separating ruthenium tetroxide from a solution of the fission products also containing rhodium, then treating the fission product solution still containing rhodium to precipitate rhodium sulfide therefrom, converting redissolved rhodium sulfide to a base-soluble complex rhodium salt, adjusting the pH of the solution to the basic range, removing precipitated base metal compounds, separating rhodium from the solution, and recovering rhodium metal.

References Cited in the file of this patent

Shpinel and Kuznetsova: Soviet Physics Jetp, vol. 3, No. 2, September 1956, pages 216–224.

Coryell and Sugarman: Radio-Chemical Studies: The Fission Products, McGraw-Hill Book Co. Inc., 1951, pages 1542–1544 pertinent. (Pages 793–804 of interest—Paper 103.)

Nuclear Science Abstracts: Vol. II, No. 1, January 15, 1957; Abstract 774.

Mellor: A Comprehensive Treatise on Inorganic and Theoretical Chemistry, vol. XV, pages 499–503 and pages 546–553.